Feb. 1, 1966      A. SINGLETON      3,232,233
KILN GUN PROJECTILE
Filed Aug. 9, 1963
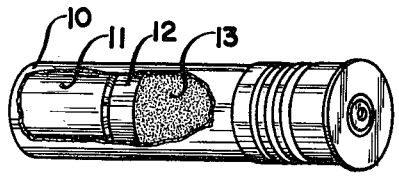
FIG_1
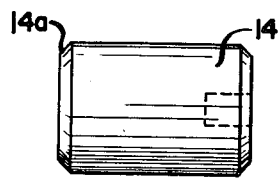 FIG_2      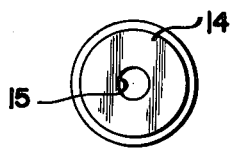 FIG_7
 FIG_3      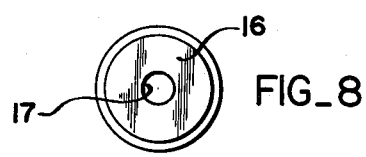 FIG_8
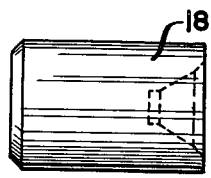 FIG_4      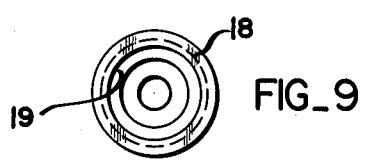 FIG_9
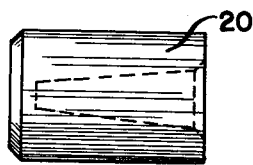 FIG_5      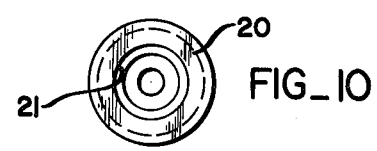 FIG_10
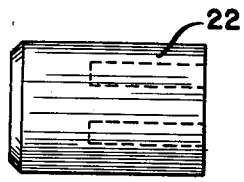 FIG_6      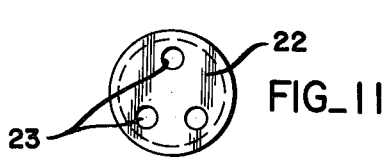 FIG_11
INVENTOR.
ARTHUR SINGLETON
BY
Oberlin, Maky & Donnelly
ATTORNEYS United States Patent Office 3,232,233
Patented Feb. 1, 1966

3,232,233
KILN GUN PROJECTILE
Arthur Singleton, Tiffin, Ohio, assignor to Basic Incorporated, Cleveland, Ohio, a corporation of Ohio
Filed Aug. 9, 1963, Ser. No. 300,987
9 Claims. (Cl. 102—92.5)

The present invention relates to a novel projectile and, more particularly, to the projectile portion of a cartridge fired from an industrial gun to dislodge a clinker stuck to the interior of a kiln and the like.

The continuous production of sintered or dead-burned materials, such as Portland cement clinker or dead-burned dolomite, by the use of rotary kilns operating at high temperatures is frequently disrupted by the gradual build-up of sintered or fused material on the refractory brick lining within a kiln. Such a build-up or coating forms most readily in the region of the hot zone of the kiln and also in the transition area between the cooler feed input end and the hot reaction zone by the accumulation of various materials agglomerated principally by low-melting reaction products such as dicalcium alumina silicate, tetracalcium alumino-ferrite, calcium ferrite, etc. This coating is thickest in the region of the hot zone farthest from the burner feed pipe and is generally referred to as a clinker, clinker ring, or simply as a ring. Such a ring is continuously being formed during the operation of the rotary kiln. If not periodically removed, the ring seriously obstructs the passage of materials through the kiln.

Rotary kilns are operated at temperatures which may range from 2500° F. to above 3100° F. depending upon the product being produced. The raw material kiln feed also varies depending on the product of manufactured desired; but the operating temperature range and variety of raw feed materials give rise to a complex series of reactions which yield, in part, low-melting compounds tending to accumulate as a "ring" regardless of the product produced. The tendency for ring formation, however, varies as to the source of the raw materials used, the fluxing or dead-burning agents employed, the raw material feed rate, and the particular process of manufacture. It can be considered as a general characteristic that a rotary kiln will form clinker rings which must periodically be removed to permit the proper flow of materials through the kiln.

Clinker ring removal has progressed from the time-consuming process of kiln-shut down, kiln cooling, and manual bar prying of the ring material; through the use of a high-pressure jet of water (a "water-bar"); to cutting a key through the ring to expose the refractory wall and thereby loosen the ring structure; and, finally, to the use of a lead projectile fired from a large bore industrial gun to disrupt the ring sufficiently that resumed rotation of the kiln dislodges it. The introduction of the industrial kiln gun has permitted the relatively easy removal of obstructing clinker rings with a minimum of downtime. However, with the increasing demand for "pure" fired refractories, the use of the commonly available metal projectiles has become objectionable due to contamination of the sintered product with an objectionable element, such as lead or zinc.

The amount of clinker-ring shooting necessary to keep a rotary kiln free from serious obstructions depends upon the volume of low-melting reaction products formed. High production operations, especially those requiring excessive amounts of fluxing agents to promote the sintering of the raw material charge, usually require shooting the ring as frequently as every 24 hours or even more frequently. Such high, but typical, shooting rates along with the high number of rounds of ammunition usually needed to disrupt the ring are of sufficient magnitude to introduce significant traces of the projectile material into the total chemical composition of the clinker. If the composition of the projectile is of an objectional chemical nature, such as lead or zinc, the frequency of ring shooting must be lessened (usually at the cost of lowered production) to avoid damaging contamination.

Moreover, some portion of a low-melting projectile such as lead or zinc may vaporize upon impinging against a kiln ring. Such volatilized projectile material becomes part of the exhaust gas-air draft system and is swept along through the kiln into the stack dust chambers and, in part, out the stack to the atmosphere. A substantial portion, however, of the volatilized projectile material precipitates along with stack dust material as a deposit in the stack dust chambers.

It is the normal practice to recycle the stack dust material back into the kiln with the clinker feed, or to use it directly in other operations, such as part of the feed to a ball mill to make finely sized clinker material. This of course has the undesired results of directly retaining the contaminate (lead, zinc, or the like) in the product or re-introducing it back into the kiln from where the contaminating cycle is repeated with accumulative effect.

After a refractory material, such as basic refractory ores, has been dead-burned or otherwise fired, the material passes through conventional crushing machines to pulverize the fired refractory to desired particle sizes. Projectiles of cast metals are also objectionable in this step of processing, since a cast iron or steel slug has frequently been known to break the jaws of a crushing machine.

It is, therefore, a principal object of the present invention to provide an improved projectile and especially one for dislodging a clinker stuck to a kiln and the like.

Another object is to provide a projectile which does not contaminate refractory material being processed in such a kiln.

A further object is to provide a projectile for a kiln cartridge and the like which cannot break jaws of a crushing mechanism upon subsequent passage of the kiln-treated refractory material through a crusher.

Other objects of the invention will become apparent as the description proceeds.

To the accomplishment of the foregoing and related ends, the invention consists of the features hereinafter fully described and particularly pointed out in the claims, the annexed drawing and following disclosure describing in detail the invention, such drawing and disclosure illustrating, however, but one or more of the various ways in which the invention may be practiced.

In the accompanying drawing:

FIGURE 1 is a perspective view of a cartridge for an industrial gun with the outer shell partially broken away to show the relative position of a projectile of the present invention;

FIGURES 2 through 6 are side elevational views of modified forms of the projectile of FIGURE 1;

FIGURES 7 through 11 are right-hand side views, respectively, of FIGURES 2 through 6.

In carrying out the present invention, the projectile is composed of a material having non-deleterious effects on the properties of a refractory to be treated in a kiln or like chamber. Preferably, the projectile comprises a material which is a sintering agent for the refractory, so that in effect the projectile contributes to the sintering amount needed for a particular firing or dead-burning operation. Further, the projectile is made friable to fragment easily upon impact as against a kiln clinker and the like, so that, again, the projectile merges into and literally becomes an acceptable part of the ultimate product of the kiln operation. In a further modification, the projectile has a cavity to provide a rupture plane, that is, to facilitate fragmentation of the projectile into relatively small particles.

The manufacture of fired refractories, such as dead-burned dolomite or magnesite, normally requires the use of certain added materials as mineralizers, known as dead-burning or sintering agents, to bring about the densification of the product at temperatures generally attainable within kilns. This is especially necessary when attempting to produce a dead-burned product from high-purity raw stone feed. In accordance with the present invention, such mineralizers may be selected from the group consisting of iron, aluminum, chromium, oxides of said materials, titania, silica, and mixtures thereof, including alloys of the metals and/or oxides. These materials are commonly added to the feed to a kiln, such as a rotary kiln, or may occur naturally as impurities in the feed. Sintering agents containing iron as the principal sintering means have been found especially adapted for use in fabricating the present projectile. For example, iron, iron oxide, and the ferrites such as alumino-ferrite and calcium ferrite are preferred. One high-purity, low-structural strength powdered iron that is very satisfactory has the following typical analysis:

|  |  | Percent |
|---|---|---|
| Iron | minimum | 96.25 |
| Silicon | maximum | 0.3 |
| Aluminum | do | 0.2 |
| Combined carbon | do | 0.25 |
| Total other elements | do | 3.00 |

Other powdered irons of varying purity may be used, the low structural strength such as ASTM B-310. Type 1, Class A, and SHE Type 2, Class A being more generally preferred.

Iron oxide is a mineralizing oxide quite frequently employed and is added in the form of mill scale, magnitite concentrate, or pyrite cinder ranging in amount from about 3 to 10 percent $Fe_2O_3$, depending upon the dead-burned product being produced. Any kiln gun projectile or particle thereof composed of iron and capable of being oxidized in a rotary kiln consequently does not contaminate but, to the contrary, promotes the densification of a dead-burned product. Kiln gun projectiles may, therefore desirably be made from one or more of the defined mineralizers, and preferably an iron composition, to preclude contamination from the commonly used lead or zinc solid, cast projectiles.

In order to render the present projectile friable and easily fragmentable upon impact, the techniques of powder metallurgy are used to fabricate the projectile body. The art of powder metallurgy is well known and lends itself particularly well to the manufacture of the present kiln gun projectiles where it is desirable to control material composition, product density, tensile strength, and product dimensions within rather definite limits. It is possible to produce a projectile of the present invention closely to meet diverse physical requirements including those of very definite mass and such friable nature to assure uniform impact fragmentation with no introduction of objectionable product contamination. This may be accomplished by selecting the composition of the powder to be pressed, the compacting pressure (into projectile form), and sintering conditions of certain temperature—time parameters under non-oxidizing conditions. A multiplicity of uniform projectiles can thereby be produced with no machining necessary to keep within the tolerances required for a smooth bore industrial kiln gun barrel.

Thus, the physical characteristics of a sintered projectile may be modified by changing either the form-pressing pressure, the sintering temperature, or the sintering time conditions which singly, or in combination, can determine the finished product density, tensile strength, hardness, and still other properties of the finished product as is well known and understood in the art of powder metallurgy. The pressing pressure may vary, for example, from about 20 to about 40 tons per square inch or more; the sintering temperature can range from at least about 1700° F. to above about 1900° F.; and the sintering time can also be varied from a matter of minutes to hours. A preferred sintering time is about 45 to 60 minutes. In making sintered iron projectiles, the forms are preferably pressed at 30 tons per square inch and sintered at about 1800° F. for a minimum of 45 minutes. These conditions produce a sintered iron projectile having good dimensional stability, an elongation of 0 to 0.5%, a tensile strength of 3,500 p.s.i., and a density of 5.5 grams per cubic centimeter which may, however, be increased to as much as 7.5 grams per cubic centimeter with acceptable impact force and fragmentation characteristics, depending upon the design of the projectile.

The use of a solid slug or cylinder is objectionable as previously mentioned, since it does not yield sufficiently small fragments upon impact (if any, in the case of lead), and because such a slug if unbroken or unshattered after being fired into a kiln, is of sufficient toughness to damage the product-sizing jaw crushers. The present projectiles can be pressed and sintered into many different modifications or variations of the basic slug shape presently used for lead or zinc projectiles and, due to the sintered friable state, are not subject to this objection of solid or cast projectiles. To facilitate further the fragmentation of the present sintered projectile, it is preferred to fabricate the projectile with a cavity, the latter providing a rupture plane. Normally and preferably, because of the problems inherent in shaping a sintered body, the cavity extends from an outer surface of the projectile body inwardly thereof, but it is within the contemplation of the invention for the cavity to be entirely within and surrounded and defined by the projectile body. The size, number, and configuration of the cavity can vary widely to meet diverse requirements. However, it is preferred to have a centered hole for the cavity which can be of varying diameter, depth, and taper to assist in the fragmentation of the projectile upon impact and to serve as a crushing plane in the event the projectile is subsequently unshattered after impinging against a kiln ring and is thus shattered by the jaws of a crushing machine. The drawing illustrates a few of the many possible modifications for the projectile body.

Referring to the figures, a cartridge shown in FIGURE 1 includes an outer shell 10 having a projectile 11 of the present invention. A wad 12 and explosive powder 13 are conventionally enclosed within the shell which is, except for the projectile 11, of standard construction.

FIGURES 2 through 11 illustrate modified forms of the projectile itself. In FIGURES 2 and 7, a projectile comprising a sintered body 14 of iron particles has an overall length of 1.5 inches and a diameter of 0.924 inch to fit a four-gauge industrial kiln gun. The flat ends of the body 14 have a 45 degree bevel 14a to assist insertion of the body into a cartridge case or shell. The body 14 is formed with a cavity 15 measuring ¼ inch in diameter and ⅜ inch in depth to assist the fragmentation after impact. The body 14 had a density of 5.5 grams per cubic centimeter and a total weight of 3 ounces after sintering. However, such sintered iron projectile bodies can be varied to have densities up to 6.2 grams per cubic centimeter and weights up to 4 ounces. As the densities increase, the size of the fragments produced from the body 14 usually also increases.

The projectile body of FIGURES 3 and 8 is similar in dimensions to the projectile body of FIGURE 2, except that the body 16 has a cavity opening or passage 17 extending up to ½ inch of the left-hand end as viewed in FIGURE 3. This opening provides a plane for crushing a projectile, as by crusher jaws, especially if it should happen to be deflected when fired into a kiln as to have its impact energy spent without otherwise being shattered.

The embodiment of FIGURES 4 and 9 comprises a sintered body 18 of the same overall dimensions of the embodiment of FIGURES 2, 3, 4, and 8, except that a cavity 19 consists of a tapered hole having a diameter of 11/16 inch at the front or right-hand end as viewed in FIGURE 4 and a diameter of 1/4 inch at a depth of 7/16 inch within the body. One particular body or slug of this embodiment had a density of 5.5 grams per cubic centimeter and a finished sintered weight of 3 ounces. When tested, this type of projectile shattered into fragments measuring on the average 1/4 inch by 3/8 inch.

The embodiment of FIGURES 5 and 10 is similar to that of FIGURES 4 and 9 as to size and weight specifications, but this four-gauge sintered iron projectile 20 has a tapered hole 21 measuring 7/16 inch in diameter at the entrance and 5/16 inch in diameter at the inner end. The passage defined by this hole is 1 and 5/16 inches long. This embodiment also gave highly satisfactory fragmentation upon impact testing into soft clay.

The embodiment of FIGURES 6 and 11 illustrates the use of a plurality of cavities. The body 22 has the same dimensions as the embodiment of FIGURES 2 and 7. Three holes or passageways 23 extend from one end of the body 22 inwardly thereof and can measure, for example, about 0.15 inch in diameter and extend about 0.75 inch longitudinally of the body. The passageways 23, as well as any of the other openings or holes, can be of any polygonal cross-section, although a circular cross-section is normally used.

Other forms embodying the features of the invention may be employed, change being made as regards the features herein disclosed, provided those stated by any of the following claims or the equivalent of such features be employed.

I therefore particularly point out and distinctly claim as my invention:

1. In the method of operating a kiln adapted for the firing of refractory material wherein a clinker ring or the like stuck to the interior of the kiln is struck by a shot projectile; the improvement of avoiding contamination of the refractory material by such a projectile by using a fragmentable projectile formed from compressed, sintered particles of a sintering agent for said refractory material having non-deleterious effects on the properties of the refractory material when fired, fragmenting the projectile upon striking the clinker ring and leaving the resulting fragments within the kiln to contribute to the amount of a sintering agent desired for the firing of the refractory material, then operating the kiln to fire said refractory material whereby the projectile fragments merge into and become a part of the kiln fired product, and recovering the fired product from the kiln.

2. The method of claim 1 wherein said particles of a sintering agent forming the projectile comprise iron.

3. The method of claim 1 wherein said particles of a sintering agent forming the projectile consists of a material selected from the group consisting of iron, aluminum, chromium, oxides of said metals, titania, silica, and mixtures thereof.

4. The method of claim 1 including the further step of subjecting said recovered fired product of the kiln to crushing means, wherein the projectile fragments cannot damage and interfere with the operation of such crushing means.

5. The method of claim 1 wherein said kiln has a stack for effluent gases and dust, and including the further step of recycling the dust from the stack back into the kiln, whereby due to the non-contaminating effect of the defined projectile, there is no accumulative collection of a contaminate in the kiln due to projectile poisoning.

6. A projectile designed for striking and dislodging a clinker adhered to a kiln and the like adapted for the dead burning of refractory material, said projectile consisting essentially of refractory materials free of an organic binder and bonded one to another solely by compressing and sintering of said particles into an integral but fragmentable body, said particles consisting essentially of a sintering agent for dead burning said refractory material, said fragmentable body having a cavity to provide a plane of rupture upon impact of the projectile and thereby facilitate its fragmentation.

7. The projectile of claim 6 wherein said particles of the projectile comprise iron.

8. The projectile of claim 6 wherein said particles of the projectile are composed of a material selected from the group consisting of iron, aluminum, chromium, oxides of said metals, titania, silica, and mixtures thereof.

9. The projectile of claim 6 wherein said body is produced by compressing said particles at a pressure within the range of about 20 tons to about 40 tons per square inch and simultaneously heating the particles at a temperature within the range of about 1700° F. to about 1900° F. for a time sufficient to sinter and self-adhere the particles one to another.

References Cited by the Examiner

UNITED STATES PATENTS

| | | | |
|---|---|---|---|
| 1,518,920 | 12/1924 | Halloran | 102—92.5 |
| 2,226,002 | 12/1940 | Langhammer | 102—92.5 |
| 2,342,799 | 2/1944 | Goetzel | 102—92.5 |
| 2,593,637 | 4/1952 | Weldin | 102—41 |
| 2,977,855 | 4/1961 | Catlin et al. | 89—24 |
| 2,995,090 | 8/1961 | Daubenspeck | 102—92.5 |

BENJAMIN A. BORCHELT, *Primary Examiner.*

FRED C. MATTERN, JR., *Examiner.*